May 25, 1937.  F. S. DICKINSON  2,081,143
CLINICAL THERMOMETER
Filed July 5, 1935
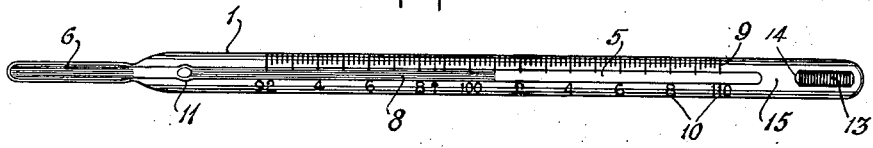
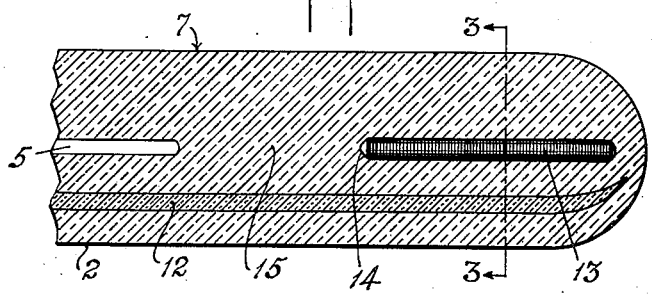
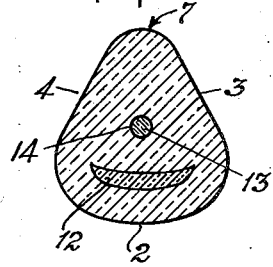
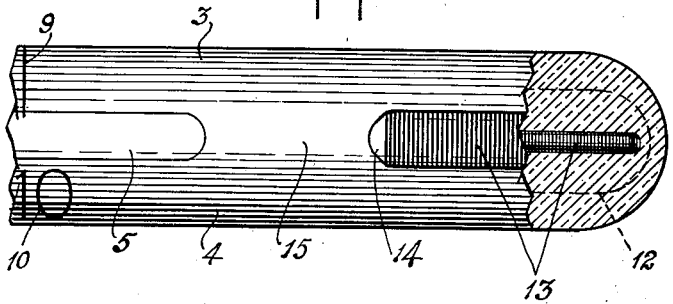
WITNESS
INVENTOR
FAIRLEIGH S. DICKINSON
BY
ATTORNEYS Patented May 25, 1937

2,081,143

UNITED STATES PATENT OFFICE 2,081,143

CLINICAL THERMOMETER

Fairleigh S. Dickinson, Rutherford, N. J.

Application July 5, 1935, Serial No. 29,875

8 Claims. (Cl. 73—52)

This invention relates to thermometers and more particularly to clinical thermometers of the type known as lens front or magnifying front.

A thermometer of the indicated type generally comprises a straight stem having a cross-section substantially in the form of an isosceles triangle and provided with a very fine axial bore or channel that is sealed at one end and communicates at its other end with a bulb filled with mercury. The edges of the stem are rounded, one of such rounded edges constituting a lens along the entire length of the stem for enlarging or magnifying the width of the column of mercury in the bore so that such column may be more easily seen by the observer when a reading of the thermometer is to be taken.

When reading a thermometer of this type, the thermometer is usually held in a horizontal position with the mercury bulb to the left and the eye of the observer looks at the column of mercury in the bore through the rounded edge of the lens portion so that the mercury column becomes visible as a broad silver stripe. Due to the fineness of the mercury column and the shape of the lens portion, however, there is but a small angle through which the mercury column can be viewed satisfactorily in its magnified form. This makes it difficult to obtain a reading on this type of thermometer for unless the observer views the mercury column almost directly along the principal axis of the lens portion, he will not be able to read its height on the scale. This disadvantage of the lens front or magnifying front type of thermometer has been long known to thermometer manufacturers and numerous efforts have been made to remedy the condition. Among the many expedients conceived to emphasize the position of the mercury column so that this type of thermometer may be read more rapidly and accurately, are the following: coloring the rear wall of the entire bore with a color such as red; incorporating in the glass immediately behind the bore a colored strip extending the full length of the bore; placing longitudinal lines of color on the outside of the thermometer extending the entire length of the scale; incorporating strips of red color within the thermometer stem extending substantially parallel with the sides of the stem throughout its length; incorporating a color reflecting surface within the thermometer stem extending the full length of the bore to reflect color on the mercury column and providing at the closed end of the thermometer a transparent ball or knob having a strip of color so arranged on the rear surface thereof that when the thermometer is turned with the strip of color to the rear, the front or clear portion of the knob will appear as of a solid color at the very instant that the lens is in proper alignment with the mercury tube in the vision of an observer.

The object of the present invention is to provide better means on thermometers of the lens front type for readily indicating to the reader the proper position in which the thermometer must be held with respect to his eyes to obtain a reading.

To accomplish the above object, the invention contemplates the provision of a colored indicating means within the thermometer stem which is so positioned with relation to the mercury bore and to the edge constituting the lens portion of the thermometer as to become clearly visible through the short upper part of such lens portion only and only when the thermometer is properly positioned with respect to the eye of the observer for reading the height of the mercury column through such lens portion while those parts of the thermometer stem which lie between the upper level of the mercury and the lower end of the colored indicating means present a color or color effect different from both that of the mercury and that of the colored indicating means.

The invention is illustrated by way of example but not by way of limitation in the accompanying drawing in which Fig. 1 is a front view of a thermometer embodying my invention; Fig. 2 is an enlarged fragmentary vertical section of the thermometer shown in Fig. 1; Fig. 3 is a section taken on line 3—3 of Fig. 2 and Fig. 4 is an enlarged fragmentary view, partly in section, of the right end portion of the thermometer shown in Fig. 1.

In the drawing, the reference character 1 designates generally the stem of a thermometer constructed in accordance with the invention and having an arcuately shaped lower side 2 and converging sides 3, 4 so that a cross section thereof is substantially in the form of a sector, as shown in Fig. 3, the edges, however, being rounded. The stem is provided with a very fine axial bore or channel 5 which communicates at one end with a mercury bulb 6 provided on one end of the glass stem in the customary manner, as shown in Fig. 1. The front edge 7 of the thermometer is rounded in the usual manner to form a lens portion along the entire length of the stem through which the column of mercury 8 in the channel 5 may be observed in magnified proportions by the reader. A scale is provided on the converging walls 3 and 4 of the stem and comprises a series of graduation marks 9 formed on the side 3 of the stem which indicate degrees subdivided into fifth parts and the usual numerals 10 formed on the side 4 of the stem which correspond with certain of the degree marks. The mercury channel 5 is enlarged and divided by a transverse partition as usual at a point 11 adjacent the bulb end of the stem for the purpose of breaking the continuity of the mercury thread and retaining the part in the bore as an index of the maximum height to which the mercury has risen in the channel under the influence of the temperature to which the bulb has been subjected. This disconnected thread of mercury may be shaken down into the bulb in the usual manner after the reading has been noted. The stem 1 also includes a strip of non-transparent material 12 in rear of the bore 5 which serves as a backing against which the mercury column can be seen readily when viewed through the lens so that the reading of the thermometer is facilitated. As shown in Fig. 2, the strip of non-transparent material 12, preferably whitened glass, is positioned in the base of the sector-shaped stem between the axial channel 5 thereof and the rear side 2 and extends along the entire length of the stem.

In accordance with the invention, the mercury bore is terminated or sealed at a point just beyond the highest graduation of the scale by a glass partition or section 15, leaving a part of the bore at 14 in the end portion of the thermometer between the sealing section 15 and the end of the thermometer. As shown in the drawing, the bore 14 is in alignment with the mercury bore 5 and in the same registry with the lens front 7 and the strip of non-transparent material 12 as the mercury bore 5. An indicating element 13 is provided in the bore 14, such element being preferably made of a homogeneous material such as glass and having some readily discernible color, such as blue or red. It will be seen that due to the arrangement of the colored element 13 with respect to the mercury bore 5 and the lens front 5, the mercury column can be read only when the colored element is in line to be enlarged by the lens, the greater visibility of the colored element affording a ready means for establishing the position of the thermometer at which the mercury column can be read.

In the organization as thus described it will be apparent that those parts of the stem which lie between the level of the mercury column (for instance 101° in Fig. 1) and the lower end at 14 of the colored element 13, are in color contrast with the mercury column on the one hand and with the colored element 13 on the other. This arrangement assures a condition of color prominence at 13.

In constructing a thermometer in accordance with the preferred form of the invention, a stem having a fine axial bore is selected which is slightly longer than that of the usual thermometer of the same range. The thermometer is then made from the stem in the usual manner up to the point where the mercury has been introduced into the structure. In the usual course of manufacture of clinical thermometers from this point on heat is supplied to the upper end of the stem, melting the glass and sealing the bore. While the glass is still in the fluid condition at the upper end of the bore the mercury bulb is heated and the expanding mercury produces a closed ball-like cavity in the molten glass at the upper end of the thermometer stem. Thereupon the instrument in this form is passed through a series of manipulations and tests not material for the purposes of the present description and at the conclusion of these the upper end of the thermometer tube below the expanded ball portion is sealed off while the ball portion and such mercury as may still be contained therein is removed.

In producing the thermometer of the present invention the upper end of the stem, before the formation of the ball-like enlargement, is sealed by heat and the upper end portion of the stem heated to approximately the fusion point of the glass, the heat being applied so that the glass is heated uniformly throughout thereby preserving the lens front along such end portion. The mercury bulb is then also subjected to heat, forcing the mercury into the soft upper end of the stem and causing the mercury to form a cylindrical enlargement of the bore at that end. This operation produces in the bore the enlargement 14 of the bore shown in Figs. 1, 2, and 4 of the drawing but the bore at that stage of operations is still continuous and uninterrupted. In order to form the enlargement 14 of the bore at the upper end of the stem, the mercury is caused to rise relatively slowly as compared with the speed at which the mercury rises when the ball-like enlargement is formed at the upper end of the stem.

After the enlargement 14 has been made, the closed end of the stem is again softened by heat and the mercury rapidly driven up by heat to form the ball-like enlargement previously referred to. Thereafter, the manipulations and tests which are ordinarily applied to thermometers while in this state, are carried out in the usual manner. At the end thereof heat is applied to the stem in the region indicated at 15 of the drawing, this heat causing the glass to fuse together thereby eliminating any effective continuation of the mercury bore 5 into the part 14 of the original continuous bore of the stem. The ball-like chamber at the outer end of the stem is then removed in the usual manner. Such mercury as remains in the bore section 14 is removed by centrifugal force or by the introduction into this part of the bore of a mercury-displacing solid or by both of such operations or in fact by any suitable available means. Preferably, however, the elimination of the mercury content of the bore section 14 is accomplished by introducing into it a closely fitting rod-like section of brightly colored glass which upon its insertion into the bore 14 remains therein when the upper end of the stem is sealed off. When the colored rod is made of vitreous material such as glass, the heat required for sealing the upper end of the stem usually fuses it in position. It is not necessary that the glass rod should fit tightly or loosely but preferably the fit should be fairly close.

It will be seen that due to the fact that the colored glass rod 13 has a larger diameter than the thread of mercury in the channel 5, it can be viewed in its magnified form through a greater angle than the column of mercury, thus enabling the reader to readily establish the approximate position in which the thermometer should be held with respect to his eyes without having as yet seen the mercury column in its magnified proportions. Thus when the user holds the thermometer so that he is looking almost directly along the principal axis of the lens portion 7 of the stem of the mercury column, the brightly colored glass rod will appear in magnified proportions against the backing of non-transparent material 12 so as to give notice to the user that he is holding the thermometer in approximately the correct position to read it. The mercury column in its magnified form may then be very easily found by a slight turning movement of the thermometer always keeping the element 13 in its magnified condition. A further advantage of the invention is that the reader can see both the mercury column and the color indicator without shifting the thermometer due to the fact that the colored element 13 is closely adjacent to the end of the scale. The user can therefore concentrate his attention on finding and reading the height of the mercury column while he can simultaneously watch for the colored element 13 in its magnified proportions thus enabling him to read a thermometer of this type with ease and readiness.

While I have illustrated and described a preferred embodiment of my invention, it will be understood that various changes in its form may be made within the scope of the claims without departing from the spirit of the invention. For example, instead of separating the colored glass rod 13 from the mercury column 5 by the closed portion 15, it may be positioned in the bore of the stem so that its inner end constitutes the end of the mercury channel. The colored element need not be cylindrical in shape or made of glass as other shapes and materials may be employed to equal advantage, the important consideration being that of whatever substance it is constituted or whatever its shape it is positioned with respect to the edge which constitutes the lens portion of the stem as to become visible in its magnified form as a continuation of the enlarged mercury column when the thermometer is correctly held with respect to the eyes of the user for reading the height of the mercury column through such lens portion.

I claim:

1. A clinical thermometer comprising a straight stem provided with a continuous lens front extending from at least the lowest graduation mark of the scale on the thermometer to the outermost sealed end of the stem, a fine bore section in said stem communicating at one end with a bulb containing mercury, a second bore section of greater cross-sectional area than the first mentioned bore in said stem terminating at the sealed end of the stem, colored material positioned in said second bore section substantially filling the same and sealed in place therein, said bore sections being in alignment with each other and so arranged with relation to said lens front that the colored material becomes clearly visible in magnified proportions through the lens front when the thermometer is properly held with respect to the reader's eye for reading the height of the mercury column in said first bore section, and a sealing partition between said bore sections to prevent intercommunication, said sealing partition being located at a point intermediate said colored material and the highest graduation of the thermometer scale.

2. A clinical thermometer comprising a stem provided with a fine axial bore communicating at one end with a bulb containing mercury and terminating at the outermost sealed end of the stem, the continuity of said bore being broken by a sealing partition located between the sealed end of the stem and the highest graduation mark of the scale on the thermometer, said bore beyond said partition being of greater cross-sectional area than the bore between the bulb and the partition, a brightly colored glass rod positioned in said bore and substantially filling the same between the sealing partition and the outermost sealed end of the stem, and a continuous lens front provided on said stem and extending from at least the lowest graduation mark of the scale to the outermost sealed end of the stem, said bore being so arranged relative to said lens front that the glass rod becomes visible as a broad colored bar through said lens front when the thermometer is correctly held with respect to the reader's eye for reading the height of the mercury column through said lens front.

3. A clinical thermometer comprising a straight stem provided with a continuous lens front extending from at least the lowest graduation mark of the scale on the thermometer to the outermost sealed end of the stem, a fine bore section in said stem communicating at one end with a bulb containing mercury, a second bore section in said stem sealed from said first bore section, brightly colored material positioned in said second bore section and sealed in position therein, said bore sections extending as a whole lengthwise of the stem and so arranged with relation to said lens front that the mercury column and colored material become visible to the observer in magnified proportions when said bore sections and lens front are aligned in his line of vision, said second bore section being so proportioned with respect to said lens front as to enable the colored material therein to be visible in its magnified proportions through a greater angle than that through which the column of mercury can be viewed in its magnified form.

4. A thermometer of the lens front type comprising a graduated readable stem, a bulb at one end, a sealed opposite end, a bore for an indicating fluid in communication with the bulb and in registry with the lens front, a bore section situated at the end of the stem beyond the maximum height of the indicating fluid in the normal use of the instrument and a colored element confined in said bore section above the highest graduation mark of the readable part of the thermometer scale, said bore section being in alignment with the bore containing the indicating fluid and in the same registry with the lens front as said indicating fluid bore, whereby the indicating fluid level can be clearly read only when the colored element is observed as enlarged by the lens, the enlarged visibility of the colored element thus serving to determine the position of the instrument at which the indicating fluid may be read.

5. A thermometer comprising a stem provided with a bulb at one end and sealed at the other end, a continuous lens front on said stem extending from at least the lowest graduation mark of the thermometer scale to the sealed end of the stem, a strip of non-transparent material coextensive with said lens front, a sealed off bore section for an indicating fluid in communication with the bulb and so positioned relative to said lens front and said non-transparent strip that the indicating fluid column will appear in magnified proportions against the backing of non-transparent material when properly viewed through the lens front, a bore section in alignment with the sealed-off bore section and having a greater cross-sectional area, a colored element situated in said enlarged bore section and substantially filling the same, said colored element being so arranged intermediate the non-transparent material and said lens front that it will appear in magnified proportions against the backing of non-transparent material when the lens front is in proper alignment with the indicating fluid column in the vision of an observer.

6. A lens front clinical thermometer having a bore transversely blocked and sealed off into two aligned sections of unequal lengths at a level intermediate between the temperature-indicating portion of the instrument and its extreme outer end, the longer section being in connection with the bulb and functioning as the temperature-reading portion of the instrument, the shorter bore section containing a color component which is in sharp contrast to the color of the indicating fluid and of the long bore section when both sections are viewed through the lens.

7. A lens front clinical thermometer having a bore whose continuity is broken by a sealing partition located between the temperature indicating portion of the instrument and its extreme outer end, that portion of the bore above said sealing partition being enlarged and containing material of a color which is in sharp contrast to the color of the mercury when said material and the mercury column are viewed through the lens in their magnified proportions.

8. A clinical thermometer comprising a straight stem provided with graduation marks and with a continuous lens front extending continuously from the lowest graduation mark of the scale to the outermost sealed end of the stem, a bore section in said stem communicating at one end with a bulb containing a temperature-indicating fluid, and continuing as a passage for the indicating fluid up to a short distance below the outer sealed end of the stem, a relatively short bore section in said stem in alignment with the first named bore section and positioned between the sealed end of the stem and the upper extremity of the temperature-indicating portion of the stem, colored material seated within the short bore section only, the color thereof being in sharp contrast with the color of the bore section along which the fluid moves, the two aligned bore sections being so positioned with relation to the lens front that when the colored material becomes clearly visible as such in magnified proportions through the lens front the indicating fluid is simultaneously also visible in magnified proportions through the lens front of the instrument, while those parts of the instrument which intervene between the level of the indicating fluid and the colored short bore section will be in sharp color contrast with the color of the indicating fluid as well as with the color of the color material within the short bore section.

FAIRLEIGH S. DICKINSON.